United States Patent
Wada (10) Patent No.: US 11,928,361 B2
(45) Date of Patent: Mar. 12, 2024

(54) MEMORY SYSTEM AND CONTROL METHOD

(71) Applicant: Kioxia Corporation, Tokyo (JP)

(72) Inventor: Taiki Wada, Tokyo (JP)

(73) Assignee: KIOXIA CORPORATION, Tokyo (JP)

( * ) Notice: Subject to any disclaimer, the term of this patent is extended or adjusted under 35 U.S.C. 154(b) by 390 days.

(21) Appl. No.: 17/406,584

(22) Filed: Aug. 19, 2021

(65) Prior Publication Data

US 2022/0197562 A1 Jun. 23, 2022

(30) Foreign Application Priority Data

Dec. 17, 2020 (JP) ................. 2020-209603

(51) Int. Cl.
*G06F 3/06* (2006.01)
*G06F 12/10* (2016.01)

(52) U.S. Cl.
CPC .......... *G06F 3/0659* (2013.01); *G06F 3/0611* (2013.01); *G06F 3/0679* (2013.01); *G06F 12/10* (2013.01); *G06F 2212/657* (2013.01)

(58) Field of Classification Search
CPC .... G06F 3/0659; G06F 3/0611; G06F 3/0679; G06F 12/10; G06F 2212/657; G06F 12/0607; G06F 2212/1024; G06F 2212/7201; G06F 2212/7203; G06F 2212/7208; G06F 12/0238
See application file for complete search history.

(56) References Cited

U.S. PATENT DOCUMENTS 9,384,124 B2 7/2016 Yamanaka et al.
9,898,207 B2 2/2018 Kim et al.

FOREIGN PATENT DOCUMENTS

JP 2010-152517 A 7/2010

*Primary Examiner* — Charles Rones
*Assistant Examiner* — Han V Doan
(74) *Attorney, Agent, or Firm* — Foley & Lardner LLP (57) ABSTRACT

In a memory system, a controller writes data of a plurality of clusters into a first memory area via a plurality of channels according to a write command regarding sequential data from a host. The controller specifies the order in which the data of the plurality of clusters is written according to log information and generates order information according to the specified order. The order information is information in which identification information of the cluster and information indicating a writing order are correlated with each other. The controller reads the data of the plurality of clusters from the first memory area according to a read instruction regarding an internal process and rearranges the read data of the plurality of clusters according to the order information. The controller writes the rearranged data of the plurality of clusters into the second memory area via the plurality of channels according to a write instruction regarding the internal process.

18 Claims, 9 Drawing Sheets

LOG INFORMATION (LogCluster) 30a,223a

| LOGICAL BLOCK ADDRESS (LBA) | LOGICAL CLUSTER ADDRESS (MCA) |
|---|---|
| 0x00000100 | MBA=0x10,MPA=0x2,MCO=0x154 |
| 0x00000101 | MBA=0x10,MPA=0x2,MCO=0x155 |
| 0x00000102 | MBA=0x10,MPA=0x2,MCO=0x156 |
| 0x00000103 | MBA=0x10,MPA=0x2,MCO=0x157 |
| 0x00000104 | MBA=0x10,MPA=0x2,MCO=0x158 |
| 0x00000105 | MBA=0x10,MPA=0x2,MCO=0x159 |
| 0x00000106 | MBA=0x10,MPA=0x2,MCO=0x15A |
| 0x00000107 | MBA=0x10,MPA=0x2,MCO=0x15B |
| 0x00000108 | MBA=0x10,MPA=0x2,MCO=0x15C |
| 0x00000109 | MBA=0x10,MPA=0x2,MCO=0x15D |
| 0x0000010A | MBA=0x10,MPA=0x2,MCO=0x15E |
| 0x0000010B | MBA=0x10,MPA=0x2,MCO=0x15F |
| 0x0000010C | MBA=0x10,MPA=0x2,MCO=0x160 |
| 0x0000010D | MBA=0x10,MPA=0x2,MCO=0x161 |
| 0x0000010E | MBA=0x10,MPA=0x2,MCO=0x162 |
| 0x0000010F | MBA=0x10,MPA=0x2,MCO=0x163 |
| 0x00000110 | MBA=0x10,MPA=0x2,MCO=0x164 |
| 0x00000111 | MBA=0x10,MPA=0x2,MCO=0x165 |

ADDRESS CONVERSION INFORMATION (LUT) 30b,224

| LOGICAL BLOCK ADDRESS (LBA) | LOGICAL CLUSTER ADDRESS (MCA) |
|---|---|
| 0x00000100 | MBA=0x10,MPA=0x2,MCO=0x154 |
| 0x00000101 | MBA=0x10,MPA=0x2,MCO=0x155 |
| 0x00000102 | MBA=0x10,MPA=0x3,MCO=0x010 |
| 0x00000103 | MBA=0x10,MPA=0x2,MCO=0x157 |
| 0x00000104 | MBA=0x10,MPA=0x2,MCO=0x158 |
| 0x00000105 | MBA=0x10,MPA=0x2,MCO=0x159 |
| 0x00000106 | MBA=0x10,MPA=0x3,MCO=0x111 |
| 0x00000107 | MBA=0x10,MPA=0x3,MCO=0x112 |
| 0x00000108 | MBA=0x10,MPA=0x3,MCO=0x113 |
| 0x00000109 | MBA=0x10,MPA=0x2,MCO=0x15D |
| 0x0000010A | MBA=0x10,MPA=0x2,MCO=0x15E |
| 0x0000010B | MBA=0x10,MPA=0x2,MCO=0x15F |
| 0x0000010C | MBA=0x10,MPA=0x2,MCO=0x160 |
| 0x0000010D | MBA=0x10,MPA=0x3,MCO=0x114 |
| 0x0000010E | MBA=0x10,MPA=0x3,MCO=0x115 |
| 0x0000010F | MBA=0x10,MPA=0x3,MCO=0x116 |
| 0x00000110 | MBA=0x10,MPA=0x3,MCO=0x117 |
| 0x00000111 | MBA=0x10,MPA=0x3,MCO=0x118 |

VALID CLUSTER POOL 223b

VALID CLUSTER DETERMINATION

| 0x0000010C | MBA=0x10,MPA=0x2,MCO=0x160 |
| 0x0000010B | MBA=0x10,MPA=0x2,MCO=0x15F |
| 0x0000010A | MBA=0x10,MPA=0x2,MCO=0x15E |
| 0x00000109 | MBA=0x10,MPA=0x2,MCO=0x15D |
| 0x00000105 | MBA=0x10,MPA=0x2,MCO=0x159 |
| 0x00000104 | MBA=0x10,MPA=0x2,MCO=0x158 |
| 0x00000103 | MBA=0x10,MPA=0x2,MCO=0x157 |
| 0x00000101 | MBA=0x10,MPA=0x2,MCO=0x155 |
| 0x00000100 | MBA=0x10,MPA=0x2,MCO=0x154 |

ORDER INFORMATION 223e

| 9 | 8 | 7 | 6 | 5 | 4 | 3 | 2 | 1 |
|---|---|---|---|---|---|---|---|---|
| MBA=0x10, MPA=0x2, MCO=0x160 | MBA=0x10, MPA=0x2, MCO=0x15F | MBA=0x10, MPA=0x2, MCO=0x15E | MBA=0x10, MPA=0x2, MCO=0x15D | MBA=0x10, MPA=0x2, MCO=0x159 | MBA=0x10, MPA=0x2, MCO=0x158 | MBA=0x10, MPA=0x2, MCO=0x157 | MBA=0x10, MPA=0x2, MCO=0x155 | MBA=0x10, MPA=0x2, MCO=0x154 |

223e1 / 223e2

MEMORY SYSTEM AND CONTROL METHOD

CROSS-REFERENCE TO RELATED APPLICATION

This application is based upon and claims the benefit of priority from Japanese Patent Application No. 2020-209603, filed Dec. 17, 2020, the entire contents of which are incorporated herein by reference.

FIELD

Embodiments described herein relate generally to a memory system and a control method.

BACKGROUND

In a memory system such as a solid state drive (SSD), according to a command received from a host, a process according to the received command is performed. At this time, in the memory system, it is desirable to shorten a time from receiving the command to completing the process according to the command.

DETAILED DESCRIPTION

At least one embodiment provides a memory system and a control method that can easily shorten a time from receiving a command to completing a process according to a command.

In general, according to at least one embodiment, there is provided a memory system including a controller, a plurality of channels, and a non-volatile memory. A plurality of channels are connected to the controller. The non-volatile memory includes a first memory area and a second memory area. Each of the first memory area and the second memory area can be accessed by the controller via the plurality of channels. The controller writes data of a plurality of clusters into the first memory area via the plurality of channels according to a write command regarding sequential data from a host. The controller specifies the order in which the data in the plurality of clusters is written according to log information. The controller generates order information according to the specified order. The order information is information in which identification information of the cluster and information indicating a writing order are correlated with each other. The controller reads data of the plurality of clusters from the first memory area according to a read instruction regarding an internal process. The controller rearranges the read data of the plurality of clusters according to the order information. The controller writes the rearranged data of the plurality of clusters into the second memory area via the plurality of channels according to a write instruction regarding the internal process.

A memory system according to at least one embodiment will be described in detail with reference to the accompanying drawings. It is noted that the present disclosure is not limited to the embodiment.

Embodiment

A memory system according to at least one embodiment is configured by connecting a non-volatile memory and a controller via a plurality of channels. The controller can write and read data into and from the non-volatile memory via the plurality of channels according to the commands from the host. The controller may receive a group of write commands of which logical address length of a write target is long to some extent and data of a plurality of clusters corresponding to the group of write commands from the host. This group of write commands will be referred to as a sequential write command. The sequential write command includes a plurality of logical addresses, and the plurality of logical addresses are consecutive for a certain length or more. The cluster is a unit of data management by the controller. The controller allocates a plurality of sequential logical addresses to a plurality of sequential physical addresses according to a sequential write command. With respect to the plurality of sequential physical addresses, the plurality of channels are selected and used in a sequential order. The controller writes data of the plurality of clusters into the plurality of sequential physical addresses in a first memory area in the non-volatile memory via the plurality of channels. At this time, the memory system generates address conversion information so that a correspondence relationship between the "plurality of sequential logical addresses" and the "plurality of sequential physical addresses" is established with respect to the first memory area.

In addition, the memory system may autonomously perform an internal process without being based on a command from the host. The internal process includes garbage collection, refreshing, and wear leveling, for example. When performing the internal process, the memory system may issue a read instruction with respect to the written data of the plurality of clusters and may read the data from the first memory area in the non-volatile memory via the plurality of channels. At this time, a time required for the read process is likely to vary among the plurality of channels, and the read data of the plurality of clusters may be received in an order which is changed from a writing order. The memory system issues a write instruction regarding the internal process with respect to the read data of the plurality of clusters in the changed order to write the read data of the plurality of clusters into a second memory area different from the first memory area in the non-volatile memory via the plurality of channels. At this time, the memory system generates the address conversion information in which a correspondence is partially broken between the "plurality of sequential logical addresses" and the "plurality of sequential physical addresses" with respect to the second memory area.

For example, after that, a group of read commands of which logical address length of a read target is long to some extent may be received from the host. This group of read commands will be referred to as a sequential read command. In this case, the memory system accesses the second memory area by using the address conversion information in which the correspondence between the "plurality of sequential logical addresses" and the "plurality of sequential physical addresses" is partially broken according to the sequential read command. That is, the memory system accesses the plurality of physical addresses in the second memory area via the plurality of channels in a partially non-sequential order. The non-volatile memory is provided with a cache for each channel. For this reason, when the plurality of channels are selected in the partially non-sequential order, a cache hit rate during the reading may decrease, and a frequency of internal data transmission may increase. For this reason, as compared with a case where the plurality of physical addresses in the second memory area are not accessed in the non-sequential order, an efficiency of the read process is decreased, and there is a possibility that a command execution time until the execution of the sequential read commands is completed is lengthened.

Therefore, in at least one embodiment, in the memory system, the data of the plurality of clusters read from the first memory area by the read instruction regarding the internal process is rearranged in a writing order specified according to the log information. The subsequent write instructions regarding the internal process write back into the second memory area in the rearranged order. Accordingly, the execution time of a subsequent sequential read command can be shortened.

Figure 1:
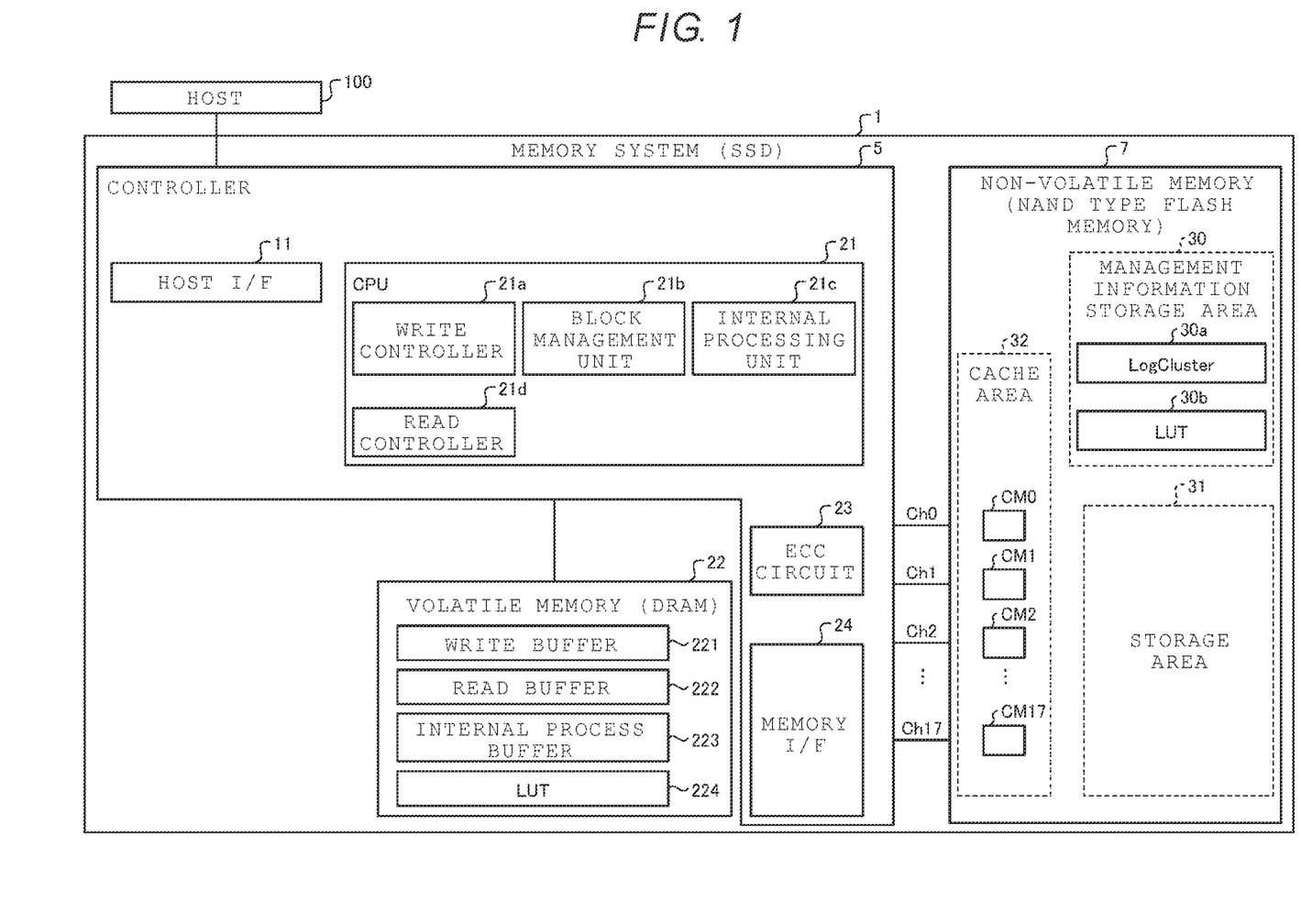
FIG. 1 is a diagram illustrating a configuration of a memory system according to at least one embodiment.

Specifically, a memory system 1 is configured as illustrated in FIG. 1. FIG. 1 is a diagram illustrating a configuration of the memory system 1.

The memory system 1 is connected to a host 100 via a communication medium and functions as an external storage device for the host 100. The host 100 includes, for example, a personal computer or a CPU core. The memory system 1 includes, for example, a solid state drive (SSD).

The memory system 1 includes a controller 5, a plurality of channels Ch0 to Ch17, a volatile memory 22, and a non-volatile memory 7. The controller 5 and the non-volatile memory 7 are connected via the plurality of channels Ch0 to Ch17. Although FIG. 1 illustrates a configuration in which the number of channels Ch is 18, the number of channels Ch is not limited to 18.

The controller 5 includes a host interface (host I/F) 11, a central processing unit (CPU) 21, a volatile memory 22, an error correction (ECC) circuit 23, and a memory interface (memory I/F) 24. The memory I/F 24 and the non-volatile memory 7 are connected via the plurality of channels Ch0 to Ch17.

In the memory system 1, data is stored non-volatilely by using the non-volatile memory 7. The non-volatile memory 7 includes a NAND type flash memory, a three-dimensional structure flash memory, a resistive random access memory (ReRAM), a ferroelectric random access memory (FeRAM), a phase change type memory (PCM), a magnetoresistive random access memory (MRAM), and the like. FIG. 1 illustrates a case where the non-volatile memory 7 is a NAND flash memory.

A plurality of logical blocks are allocated to the non-volatile memory 7 by the controller 5. Among the plurality of logical blocks, some logical blocks are allocated to a management information storage area 30, and the remaining (most) logical blocks are allocated to a storage area 31. Each logical block includes a plurality of logical pages. The storage area 31 is an area into which data requested to be written by the host 100 is stored, and the management information storage area 30 is an area into which management information by the controller 5 is stored.

For example, the logical block BL0 includes a plurality of logical pages PG0 to PG(N−1) (denoted by PG when the logical pages are not particularly distinguished from each other). N represents any integer of two or more. Each logical page PG includes a plurality of banks capable of bank interleaving. The bank interleaving is possible with respect to two banks BK (BK0 and BK1) for each channel Ch0 to Ch17. Each bank BK includes a plurality of memory chips CP. Each memory chip CP may include a plurality of planes that can be accessed in parallel.

Figure 2:
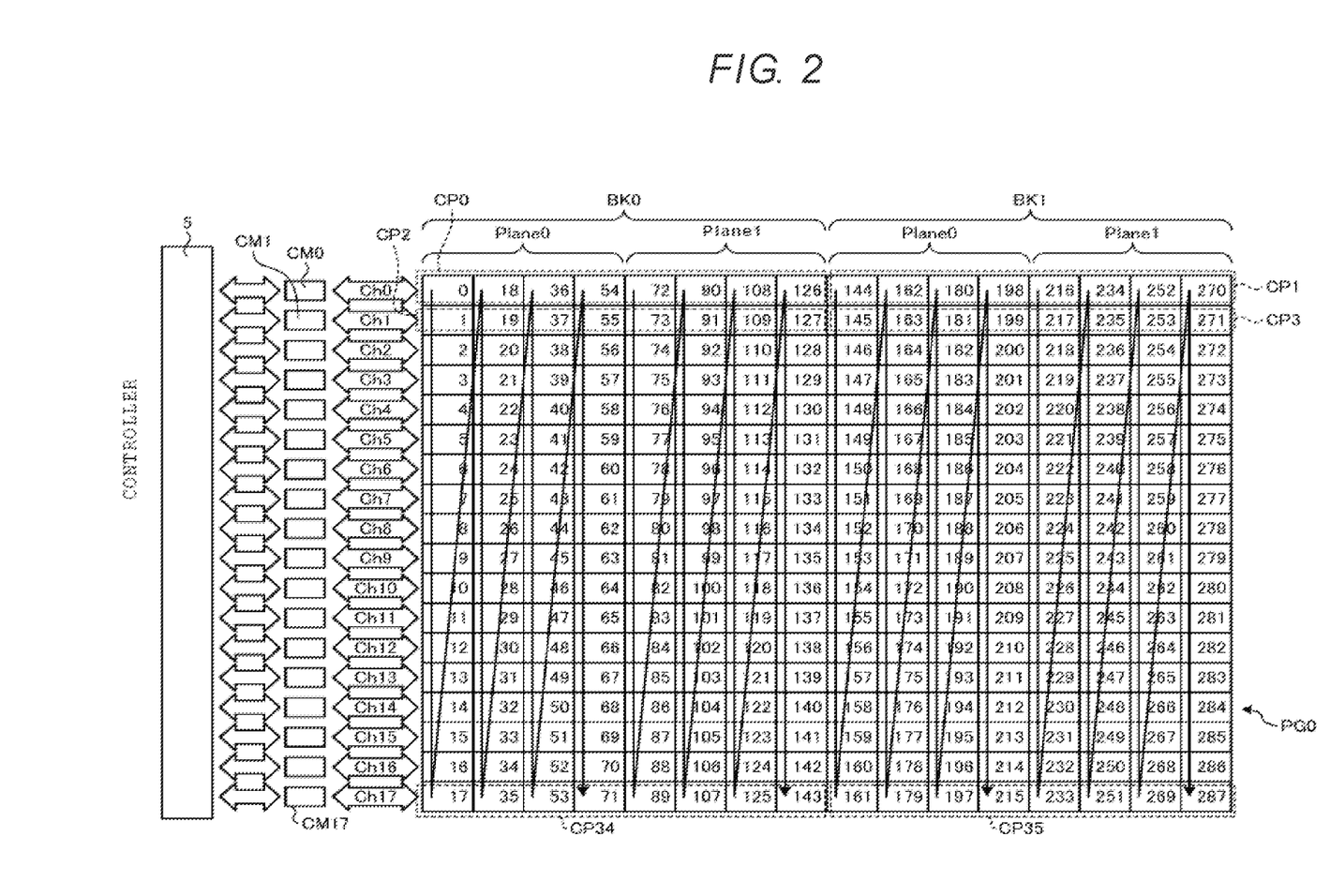
FIG. 2 is a diagram illustrating a logical page in at least one embodiment.

For example, the logical page PG0 includes two banks BK0 and BK1 as illustrated in FIG. 2. FIG. 2 is a diagram illustrating a configuration of the logical page PG0, and configurations of the other logical pages PG1 to PG(N−1) are the same as the configurations of the logical page PG0.

The plurality of banks BK0 and BK1 may be configured to be capable of operating in parallel by bank interleaving. The bank BK0 includes memory chips CP0, CP2, ..., CP34 (hereinafter referred to as CP0 to CP34). The memory chips CP0 to CP34 in the bank BK0 can be accessed in parallel from the memory I/F 24 via the plurality of channels Ch0 to Ch17. The bank BK1 includes memory chips CP1, CP3, ..., CP35 (hereinafter referred to as CP1 to CP35). The memory chips CP1 to CP35 in the bank BK1 can be accessed in parallel from the memory I/F 24 via the plurality of channels Ch0 to Ch17. Each of the memory chips CP0 to CP35 may include a plurality of planes Plane0 and Plane1 capable of operating in parallel within each of the memory chips CP0 to CP35. Each of the memory chips CP0 to CP35 includes a plurality of memory cell arrays MAR, and some memory cell arrays MAR constitute one or more physical blocks.

Figure 3:
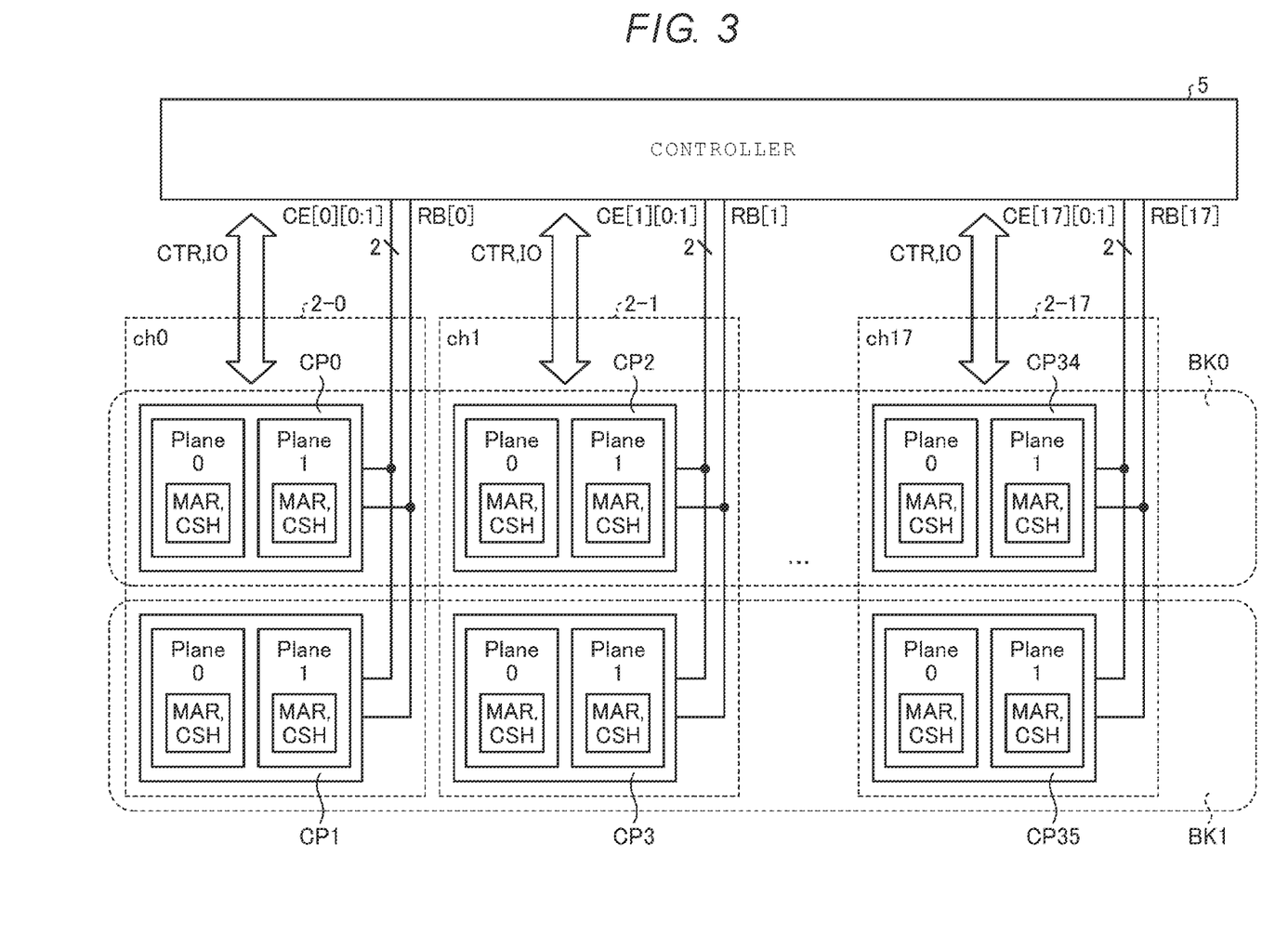
FIG. 3 is a diagram illustrating a plurality of parallel operation elements in at least one embodiment.

As illustrated in FIG. 3, the non-volatile memory 7 is configured with a plurality of channel parallel operation elements 2 (2-0 to 2-17). The plurality of channel parallel operation elements 2-0 to 2-17 and the memory I/F 24 are connected by the plurality of channels Ch0 to Ch17. The plurality of channel parallel operation elements 2-0 to 2-17 correspond to the plurality of channels Ch0 to Ch17. Each of the channels Ch0 to Ch17 includes a plurality of communication lines connecting the corresponding channel parallel operation element 2 and the memory I/F 24. For example, each of the channels Ch0 to Ch17 has a control signal line CTR, an I/O signal line IO, a chip enable signal line CE[0] [0:1] to [17] [0:1], and a ready/busy signal line RB[0] to RB[17], respectively. Each of the channel parallel operation elements 2-0 to 2-17 constitutes the plurality of banks (two banks BK0 to BK1 in FIGS. 2 and 3), and each of the banks BK is configured with the plurality of memory chips CP. Each memory chip CP has the plurality of planes Plane0 to Plane1. Each Plane includes the memory cell array MAR and a cache CSH. The cache CSH is electrically connected between the memory cell array MAR and input/output terminals in the memory chip CP.

In the channel parallel operation element 2-$k$ ($k$=0 to 17), the controller 5 individually controls the plurality of banks BK0 to BK1 sharing the control signal line CTR and the I/O signal line IO by the two chip enable signal lines CE[k] [0:1] for each bank. CE[k] [0] is the chip enable signal line for the bank BK0, and CE[k] [1] is the chip enable signal line for the bank BK1. Herein, a value of CE[k][0] indicates a selected state of the bank BK0 (any one of CP0 to CP34), and a value of CE[k][1] indicates a selected state of the bank BK1 (any one of CP1 to CP35). The controller 5 monitors an access status of the plurality of banks BK0 to BK1 sharing the control signal line CTR and the I/O signal line IO by using one ready/busy signal line RB[k]. When CE[k][0] becomes active, a value of RB[k] indicates the access status of the bank BK0 (CP0 to CP34), and when CE[k][1] becomes active, the value of RB[k] indicates the access status of the banks BK1 (CP1 to CP35). Herein, it is assumed that the signal RB=Low indicates a busy state and the signal RB=High indicates a ready state.

Figure 4:
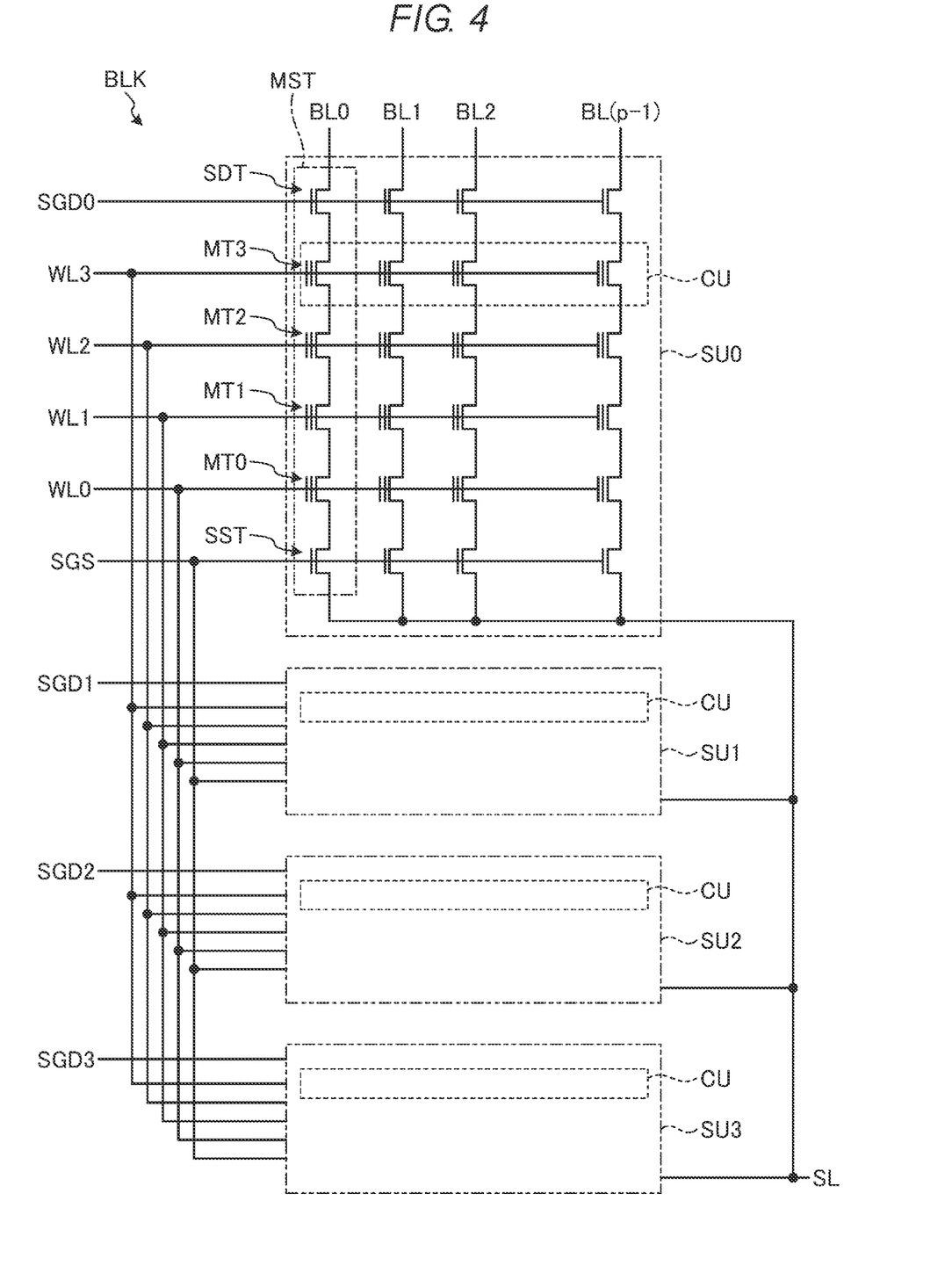
FIG. 4 is a diagram illustrating a physical block according to at least one embodiment.

Each memory chip CP is subjected to a write process and a read process in a unit referred to as a physical page and is subjected to an erasing process in a unit referred to as a physical block including a plurality of the physical pages. The controller 5 can collectively perform the erasing process in units of a logical block including a plurality of the physical blocks. Each memory chip includes the plurality of planes (Plane0 and Plane1 in FIGS. 2 and 3) as units that can be accessed in parallel. Each plane includes one or more physical blocks. As illustrated in FIG. 4, each physical block includes memory cells at intersections of a plurality of word lines and a plurality of bit lines. FIG. 4 is a diagram illustrating a configuration of the physical block.

Each physical block BLK has a plurality of string units SU0 to SU3. The plurality of string units SU0 to SU3 respectively correspond to the plurality of selection gate lines SGD0 to SGD3 and share the selection gate line SGS. Each of the string units SU0 to SU3 functions as a drive unit in the physical block BLK. Each of the string units SU0 to SU3 is driven by the corresponding selection gate line among the plurality of selection gate lines SGD0 to SGD3 and the selection gate line SGS. In addition, each of the string units SU0 to SU3 includes a plurality of memory strings MST.

Each of the memory strings MST includes, for example, four memory cell transistors MT (MT0 to MT3) and selection transistors SDT and SST. The memory cell transistor MT has a control gate and a charge storage film, and stores data non-volatilely. Then, the four memory cell transistors MT (MT0 to MT3) are connected in series between a source of the selection transistor SDT and a drain of the selection transistor SST. It is noted that the number of memory cell transistors MT in the memory string MST is not limited to four.

The bit lines BL0 to BL(p-1) (denoted by BL when the bit lines are not distinguished from each other) are connected to the memory string MST. When the selection transistor SDT is turned on, a channel region of each memory cell transistor MT in the memory string MST is conducted to the bit line BL.

The word lines WL0 to WL3 (denoted by WL when the word lines are not distinguished from each other) connect the control gate of the memory cell transistor MT in common between the memory strings MST in each string unit SU in the physical block BLK. That is, the control gates of the memory cell transistors MT in the same row in each string unit SU in the physical block BLK are connected to the same word line WL. That is, the string unit SU of the physical block BLK includes a plurality of cell units CU corresponding to the plurality of word lines WL, and each cell unit CU includes the p memory cell transistors MT connected to the same word line WL. When having such a configuration that a 1-bit value can be stored in each memory cell transistor MT (when operating in single-level cell (SLC) mode), the p memory cell transistors MT (that is, the cell units CU) connected to the same word line WL are treated as one physical page, and the data write process and the data read process are performed for each physical page. It is noted that, although the four word lines WL (WL0 to WL3) are illustrated in FIG. 4, the number of word lines WL is not limited to four.

In some cases, each memory cell transistor MT may be configured to be able to store a value of a plurality of bits. For example, when each memory cell transistor MT can store a value of n (n≥2) bits, a storage capacity per cell unit CU is equal to a size of the n physical pages. In a multi-level cell (MLC) mode in which each memory cell transistor MT stores a 2-bit value, each cell unit CU stores data for two physical pages. In a triple-level cell (TLC) mode in which each memory cell transistor MT stores a 3-bit value, data for three physical pages is stored in each cell unit CU.

Returning to FIG. 1, the non-volatile memory 7 further has a cache area 32. The cache area 32 is arranged between the storage area 31 and the plurality of channels Ch0 to Ch17. The cache area 32 has a plurality of caches CM0 to CM17. The plurality of caches CM0 to CM17 correspond to the plurality of channels Ch0 to Ch17. Each of the caches CM0 to CM17 temporarily stores data exchanged between the controller 5 and the storage area 31 via the respective channel Ch. Each cache CM includes the cache CSH electrically connected between the memory cell array MAR and the input/output terminals in the memory chip CP connected via the respective channel Ch. For example, the cache CM0 includes the cache CSH of the memory chip CP0 and the cache CSH of the memory chip CP1 (refer to FIG. 3).

The controller 5 is configured with, for example, a semiconductor chip (SoC: System on a Chip) such as a large-scale integrated circuit (LSI). The controller 5 controls data transmission between the host 100 and the non-volatile memory 7.

In the controller 5, when the host I/F 11 receives the write command including the logical address and the write data from the host 100, the host I/F 11 transmits the write command to the CPU 21. When the host I/F 11 receives the read command including the logical address from the host 100, the host I/F 11 transmits the read command to the CPU 21. The CPU 21 includes a write controller 21a, a block management unit 21b, an internal processing unit 21c, and a read controller 21d.

The volatile memory 22 is a volatile semiconductor memory that can be accessed at a higher speed than the non-volatile memory 7, and a static random access memory (SRAM) or a dynamic random access memory (DRAM) is used. In FIG. 1, a case where the volatile memory 22 is a DRAM is illustrated.

The volatile memory 22 has a write buffer 221, a read buffer 222, and an internal process buffer 223. The write buffer 221 is an area in which the write data instructed by the write command from the host 100 is temporarily stored. The read buffer 222 is an area in which data read from the non-volatile memory 7 by the read command from the host 100 is temporarily stored. The internal process buffer 223 is a buffer in which data that is a target of the internal process is temporarily stored when the internal process is executed in the memory system 1. In addition, the volatile memory 22 may store address conversion information (LUT) 224. Address conversion information (LUT) 30b is information in which the correspondence between the logical address of the user data stored in the non-volatile memory 7 and the physical address in which the user data is stored is recorded and is also referred to as a look-up table (LUT). The logical address includes a logical block address (LBA). The physical address includes a logical cluster address (MCA: Media Cluster Address) described later. The CPU 21 stores the address conversion information (LUT) 224 in the volatile memory 22 as the address conversion information (LUT) 30b into the management information storage area 30 at a certain timing to non-volatilize the address conversion information.

When the write controller 21a receives the write command and the data that is the write target from the host 100 via the host I/F 11, the write controller 21a performs an error correction coding process on the data by using an ECC circuit 23 and generates a symbol including a data portion corresponding to the data and an error correction code to temporarily store the symbol into the write buffer 221. The write controller 21a allocates the logical address included in the write command to the physical address and updates the address conversion information (LUT) 224 and log information (LogCluster) 30a accordingly. The log information 30a is information indicating a history of the write process and is information in which the correspondence between the logical address and the physical address during the writing is recorded. The write controller 21a writes the symbol temporarily stored in the write buffer 221 to the allocated physical address in the non-volatile memory 7 via the memory I/F 24 and the channel Ch. In addition, the write controller 21a stores the updated log information 30a into the management information storage area 30.

The block management unit 21b manages the number of free blocks that are the logical blocks in which data can be written, and a valid data rate in the logical blocks, for example. When the number of free blocks is insufficient, the block management unit 21b increases the number of free blocks by causing the internal processing unit 21c to execute garbage collection. In addition, when there is an area in the block of which performance is lower than a reference, the block management unit 21b relocates the data in that area to another area in the block or another block to prevent from deteriorating in performance. The block management unit 21b instructs the internal processing unit 21c to execute the internal process.

The internal processing unit 21c controls operations of each component correlated with the internal process while using the internal process buffer 223. The internal process includes garbage collection, refreshing, and wear leveling, for example. The garbage collection is a process of organizing unused or in-use logical pages within the logical block. By executing the garbage collection, the discretized in-use logical pages are grouped together into one logical block, so that the free block is allocated. The refreshing is a process of rewriting the data of the logical block that is worn such that the bit error rate becomes higher than a certain value in the logical block to another logical page. Read/write performance is secured by performing the refreshing. The wear leveling is a process of leveling the number of times of writing or erasing for each block among the plurality of logical blocks. One type of the wear leveling is refreshing to move valid data between the blocks.

When the read controller 21d receives the read command from the host 100 via the host I/F 11, the read controller 21d refers to the address conversion information (LUT) 224 and specifies the physical address (MCA) corresponding to the logical address (LBA) included in the read command. The read controller 21d reads the symbol including the data portion and the error correction code from the specified physical address in the non-volatile memory 7 via the memory I/F 24 and the channel Ch. The read controller 21d performs an error correction/decoding process of the data portion by using the error correction code included in the read symbol and temporarily stores the processed data as the read data into the read buffer 222. The read controller 21d transfers the read data to the host 100 via the host I/F 11.

In the memory system 1, internal data management by the controller 5 is performed in units of a cluster, and updating the data from the host 100 is performed in units of a sector. In FIG. 2, one square written with values of from "0" to "287" indicates a cluster. As illustrated in FIG. 2, the logical page PG is assumed to be a unit in which the plurality of clusters are grouped together, and the cluster is assumed to be a unit in which a plurality of sectors are grouped together. The sector is a minimum access unit for data from the host 100. The sector has a size of, for example, 512 B, and the cluster has a size of, for example, 4 KB. The host 100 can designate the data to be accessed by the logical block address (LBA). The controller 5 can further designate the logical cluster address (MCA: Media Cluster Address) according to the cluster to be accessed in the logical block with respect to the logical block address (LBA) designated by the host 100.

The controller 5 may receive the group of write commands of which logical address length of the write target is long to some extent and the data of the plurality of clusters corresponding to the group of write commands from the host 100. This group of write commands is referred to as a sequential write command. The sequential write command includes the plurality of logical addresses, and the plurality of logical addresses are consecutive for a certain length or more. The controller 5 allocates the plurality of sequential logical addresses to the plurality of sequential physical addresses according to the sequential write command. The plurality of sequential physical addresses can be obtained by selecting the plurality of channels Ch0 to Ch17 in the sequential order. The controller 5 writes the data of the plurality of clusters into the plurality of sequential physical addresses in the first memory area in the non-volatile memory 7 via the plurality of channels Ch0 to Ch17.

For example, as illustrated in FIG. 2, the controller 5 allocates the logical address included in the sequential write command to the physical addresses to update the address conversion information (LUT) 224 accordingly. Along with that, the controller 5 updates the log information (LogCluster) 30a. The controller 5 writes the first 18 cluster data into the plane Plane0 of the bank BK0 of the logical page PG0 of the logical block BL0 in the non-volatile memory 7 by sequentially using the plurality of channels Ch0 to Ch17. In FIG. 2, the order of writing into each cluster is denoted by numbers from "0" to "17". Similarly, with respect to the "18-th" to "287-th" cluster data, the controller 5 writes the cluster data into the corresponding cluster in the logical page PG0 of the logical block BL0 in the non-volatile memory 7 while sequentially using the plurality of channels Ch0 to Ch17. Along with that, the controller 5 updates the log information 30a. When the write process is completed, the controller 5 stores the updated log information 30a into the management information storage area 30.

In addition, the controller 5 may autonomously perform the internal process without being based on the command from the host 100. At this time, the controller 5 specifies the order in which the data of the plurality of clusters is written according to the log information 30a. The controller 5 generates order information 223e according to the specified order. The order information 223e is information in which the cluster identification information and the information indicating the writing order are correlated with each other (refer to FIG. 6). The controller 5 reads data of the plurality of clusters from the first memory area in the non-volatile memory 7 according to the read instruction regarding the internal process. The controller 5 rearranges the read data of the plurality of clusters according to the order information 223e. The controller 5 allocates a plurality of consecutive logical cluster addresses to the rearranged data of the plurality of clusters to update the log information 30a accordingly. The controller 5 writes the data of the plurality of clusters into the second memory area in the non-volatile memory 7 via the plurality of channels Ch0 to Ch17 according to the write instruction regarding the internal process. When the internal process is completed, the controller 5 stores the log information 30a into the management information storage area 30.

Figure 5:
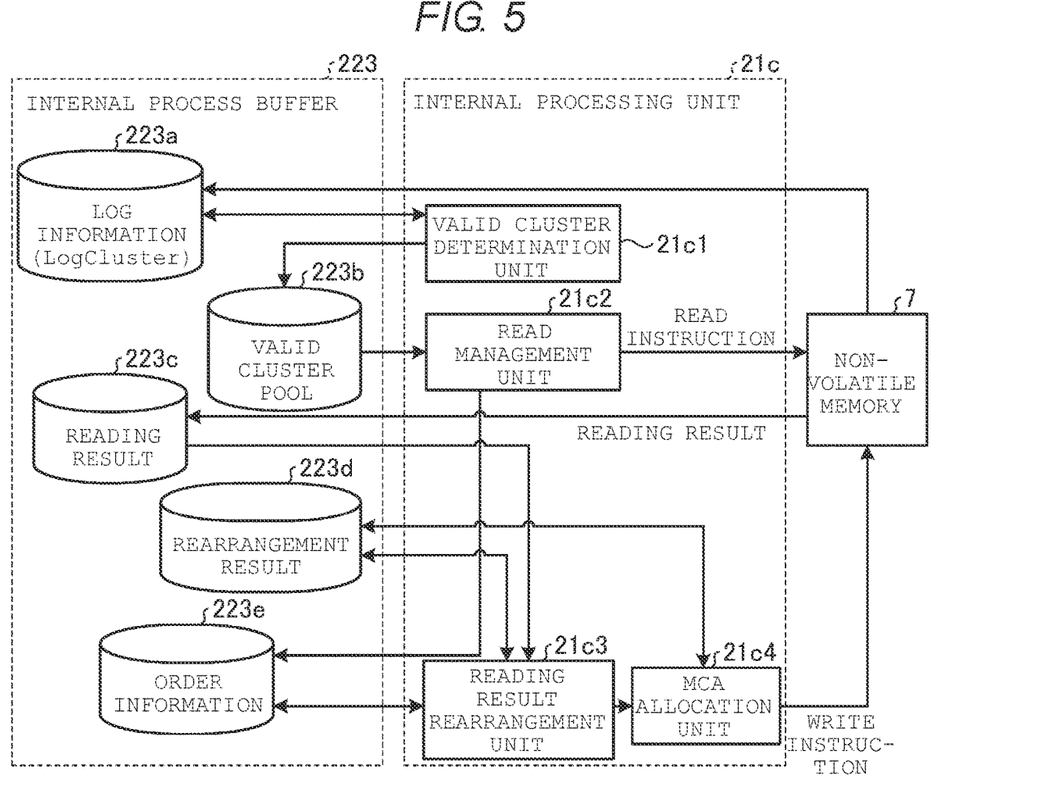
FIG. 5 is a diagram illustrating a configuration and operations of an internal processing unit according to at least one embodiment.

Specifically, in the controller 5, as illustrated in FIG. 5, the internal processing unit 21c includes a valid cluster determination unit 21c1, a read management unit 21c2, a reading result rearrangement unit 21c3, and an MCA allocation unit 21c4. Each configuration in the internal processing unit 21c is functionally implemented by the CPU 21 when firmware is executed by the controller 5. It is noted that at least a portion of each configuration in the internal processing unit 21c may be implemented by hardware (circuit).

Figure 6:
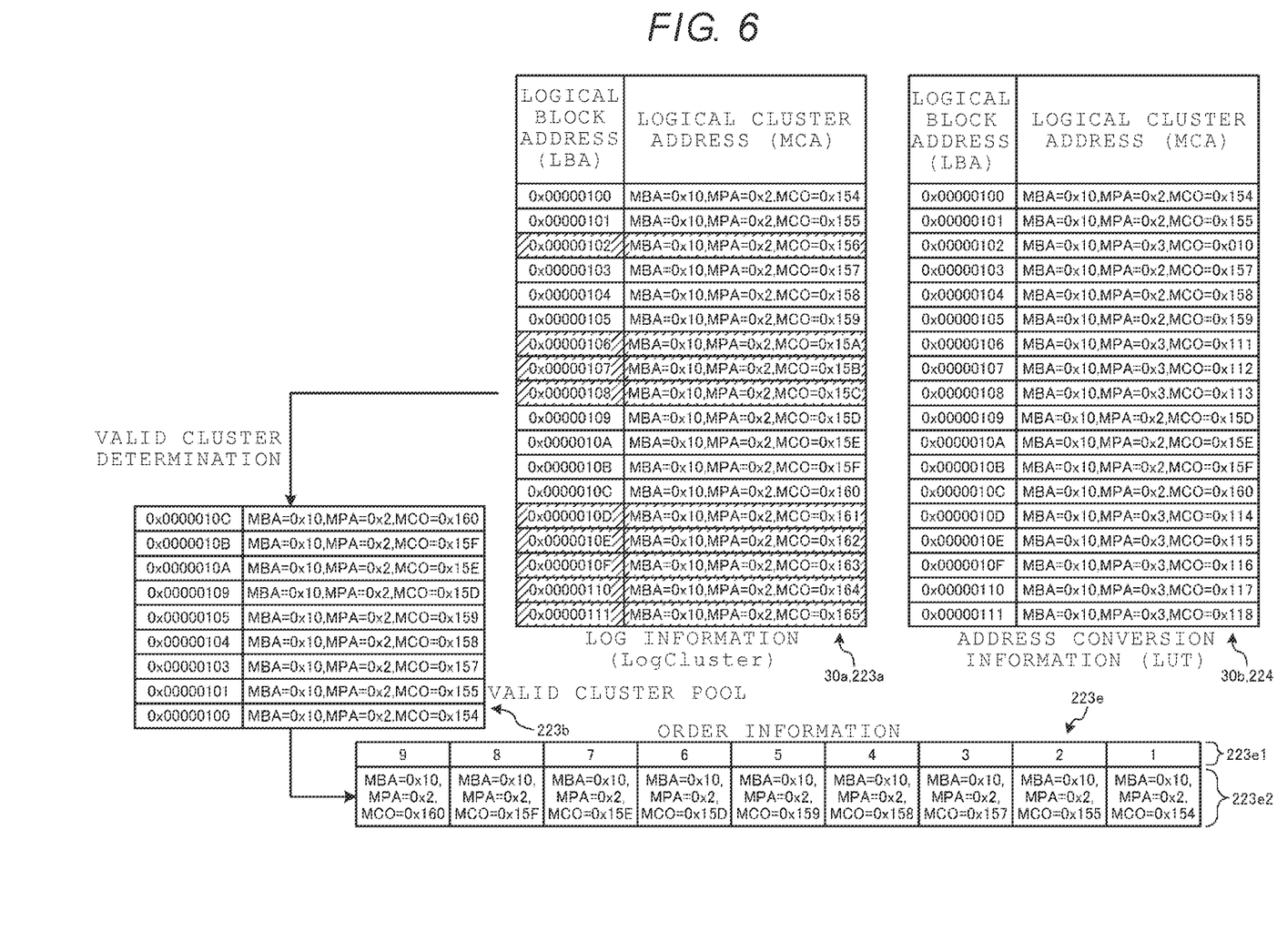
FIG. 6 is a diagram illustrating a process of generating order information in at least one embodiment.

The internal processing unit 21c performs the internal process on the plurality of logical pages for each logical page. When the valid cluster determination unit 21c1 receives the request for the internal process from the block management unit 21b, the valid cluster determination unit 21c1 accesses the management information storage area 30 of the non-volatile memory 7 to read the log information (LogCluster) 30a. The valid cluster determination unit 21c1 temporarily stores the log information 30a as log information 223a into the internal process buffer 223. As illustrated in FIG. 6, the log information 30a or 223a is information in which the logical block address (LBA) and the logical cluster address (MCA) are correlated to each other and recorded in a time order. FIG. 6 is a diagram illustrating a process of generating the order information 223e. In the case of FIG. 6, the log information 30a or 223a is information newly recorded in the order from the top line to the bottom line. The logical block address (LBA) is the logical address indicating the logical block designated by the host 100. The logical cluster address (MCA) is a physical address indicating the physical location in which the data in the non-volatile memory 7 is recorded. The logical cluster address (MCA) may include a logical block address (MBA: Media Block Address)+a logical page address (MPA: Media Page Address)+a cluster offset (MCO: Media Cluster Offset) within the logical page.

It is noted that, in FIG. 6, the address conversion information 30b or 224 is illustrated next to the log information 30a or 223a. The log information 30a or 223a and the address conversion information 30b or 224 are common in that the logical address (for example, a host-designated logical block address (LBA)) and the physical address (for example, a controller-designated logical cluster address (MCA)) are correlated with each other. In addition, the log information 30a or 223a indicates the history of the correspondence between the logical address during the writing in the past and the physical address, whereas the address conversion information 30b or 224 indicates the correspondence between the latest logical address and the physical address, and thus, the log information 30a or 223a and the address conversion information 30b or 224 differ from each other.

The valid cluster determination unit 21c1 illustrated in FIG. 5 refers to the log information 30a or 223a and the address conversion information 30b or 224 and determines the valid cluster in the logical page that is the process target. That is, the valid cluster determination unit 21c1 reads the log information 30a of the logical page that is the process target from the non-volatile memory 7 and temporarily stores the read log information 30a as the log information 223a into the internal process buffer 223. The valid cluster determination unit 21c1 refers to the address conversion information 30b or 224 by using the logical block address (LBA) of the log information 223a as a key. The valid cluster determination unit 21c1 compares the logical cluster address (MCA) corresponding to the logical block address (LBA) on the log information 223a with the logical cluster address (MCA) corresponding to the logical block address (LBA) on the address conversion information 224. When the two are the same, the valid cluster determination unit 21c1 determines that the cluster indicated by the logical cluster address (MCA) on the log information 223a is a valid cluster. When the two are different, the valid cluster determination unit 21c1 determines that the cluster indicated by the logical cluster address (MCA) on the log information 223a is an invalid cluster.

For example, as illustrated in FIG. 6, when the logical page PG0 of the logical block BL0 is the logical page that is the process target, the valid cluster determination unit 21c1 refers to the log information 223a to specify the logical cluster addresses "MBA=0x10, MPA=0x2, MCO=0x154" to "MBA=0x10, MPA=0x2, MCO=0x165" corresponding to each of the logical block addresses 0x00000100 to 0x00000111 corresponding to the logical page PG0. The valid cluster determination unit 21c1 refers to the address conversion information 224 by using each of the logical block addresses 0x00000100 to 0x00000111 corresponding to the logical page PG0 as a key. The valid cluster determination unit 21c1 specifies the logical cluster addresses "MBA=0x10, MPA=0x2, MCO=0x154" to "MBA=0x10, MPA=0x3, MCO=0x118" corresponding to each of the logical block addresses 0x00000100 to 0x00000111 on the address conversion information 224. The valid cluster determination unit 21c1 compares the logical cluster address on the log information 223a with the logical cluster address on the address conversion information 224 with respect to each of the logical block addresses 0x00000100 to 0x00000111. When the two are the same, the valid cluster determination unit 21c1 determines that the cluster indicated by the logical cluster address (MCA) on the log information 223a is a valid cluster.

For example, with respect to the logical block address 0x00000100, the logical cluster address "MBA=0x10, MPA=0x2, MCO=0x154" on the log information 223a and the logical cluster address "MBA=0x10, MPA=0x2, MCO=0x154" on the address conversion information 224 are the same. For this reason, the valid cluster determination unit 21c1 determines that the cluster indicated by the logical cluster address "MBA=0x10, MPA=0x2, MCO=0x154" is a valid cluster.

In addition, with respect to the logical block address 0x00000102, the logical cluster address "MBA=0x10, MPA=0x2, MCO=0x156" on the log information 223a and the logical cluster address "MBA=0x10, MPA=0x3, MCO=0x010" on the address conversion information 224 are different from each other. For this reason, the valid cluster determination unit 21c1 determines that the cluster indicated by the logical cluster address "MBA=0x10, MPA=0x2, MCO=0x156" is an invalid cluster.

Similarly, the valid cluster determination unit 21c1 determines that the cluster indicated by the logical cluster address without diagonal hatching among the logical cluster addresses on the log information 223a in FIG. 6 is a valid cluster and determines that the cluster indicated by the logical cluster address with diagonal hatching is an invalid cluster.

The valid cluster determination unit 21c1 illustrated in FIG. 5 checks in address order whether the logical cluster address on the log information 223a is the physical address of the valid cluster or the physical address of the invalid cluster for each logical block address corresponding to the logical page that is the process target and generates or sequentially updates a valid cluster pool 223b according to the check result to store the generated or updated valid cluster pool into the internal process buffer 223. When the logical cluster address is the physical address of the valid cluster, the valid cluster determination unit 21c1 adds the logical cluster address to the valid cluster pool 223b. When the logical cluster address is the physical address of the invalid cluster, the valid cluster determination unit 21c1 does not add the logical cluster address to the valid cluster pool 223b. Accordingly, as illustrated in FIG. 6, the logical cluster addresses of the valid clusters are stored in the valid cluster pool 223b in the writing order. This writing order is the same order as the order written in the past by the sequential write commands and indicates the order to be written by the internal process. When the valid cluster pool 223b has a first-in-first-out (FIFO) structure, the logical cluster addresses of the valid clusters are stored in the writing order from the beginning to the end of the valid cluster pool 223b.

The read management unit 21c2 illustrated in FIG. 5 refers to the valid cluster pool 223b, specifies the writing order of the valid clusters in the logical page that is the process target, as illustrated in FIG. 6, and generates the order information 223e according to the specified writing order. The order information 223e is information in which an MCA allocation order 223e1 and the logical cluster identification information 223e2 are correlated with each other for a plurality of logical clusters. The MCA allocation order 223e1 is information indicating the order in which the logical cluster addresses (MCA) are to be newly allocated and is, for example, information indicating the order. The logical cluster identification information 223e2 is information that identifies the plurality of logical clusters and is, for example, the logical cluster addresses that are currently allocated.

Figure 7:
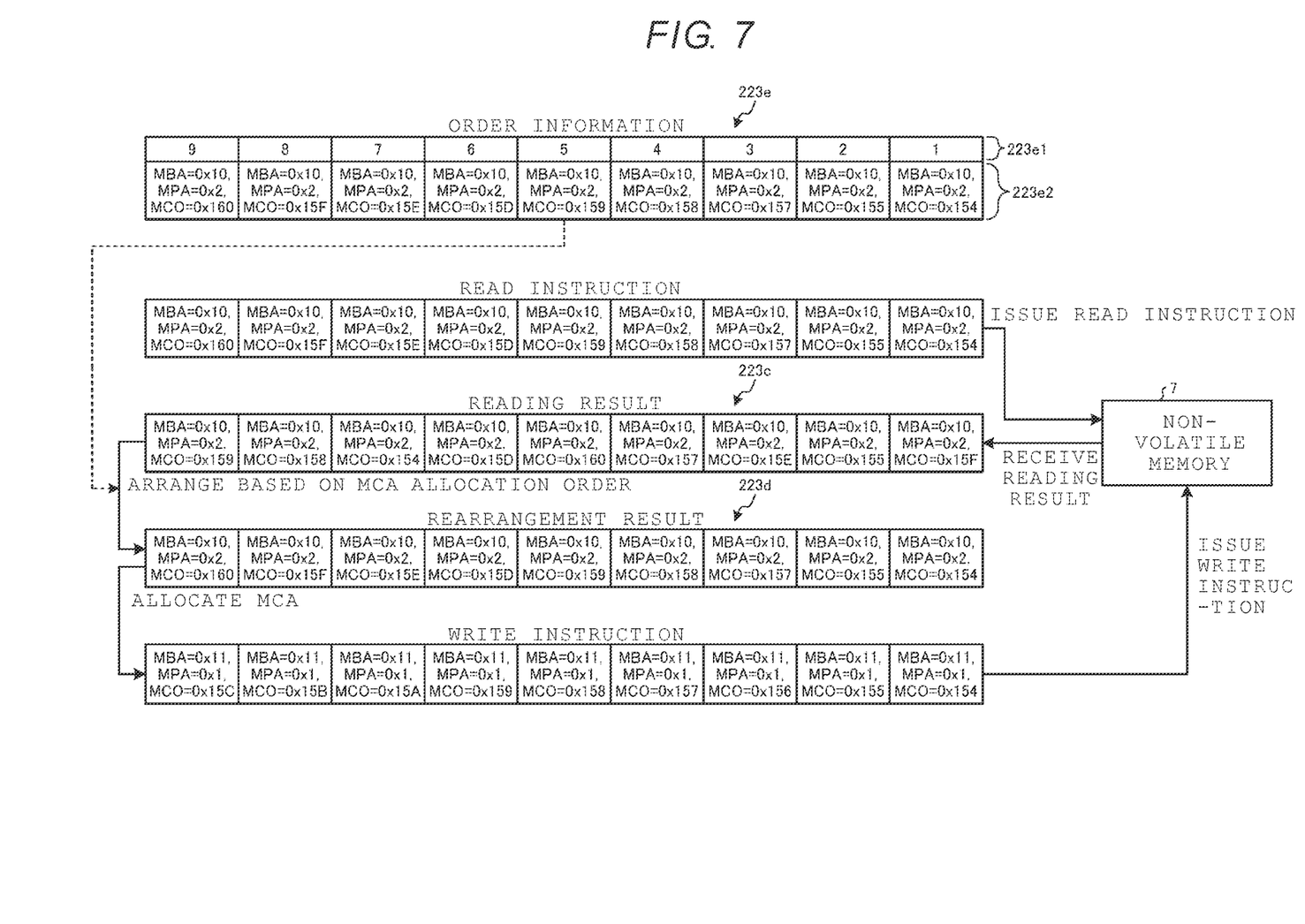
FIG. 7 is a diagram illustrating a process of rearranging data of a plurality of clusters in at least one embodiment.

In addition, the read management unit 21c2 illustrated in FIG. 5 refers to the valid cluster pool 223b, and with respect to the logical page that is the process target, as illustrated in FIG. 7, issues the read instruction regarding the internal process in a form sequentially including the logical cluster addresses of the valid cluster. The read management unit 21c2 supplies the issued read instruction to the non-volatile memory 7 via the plurality of channels Ch. FIG. 7 is a diagram illustrating a process of rearranging the data of the plurality of clusters. Accordingly, the non-volatile memory 7 executes the read instruction while using the cache area 32, reads the data of the plurality of clusters from the designated physical position in the storage area 31, and returns the read reading result to the read management unit 21c2 via the plurality of channels Ch.

At this time, the time required for the read process is likely to vary among the data of the plurality of clusters in the non-volatile memory 7, and the read management unit 21c2 can receive the read data of the plurality of clusters in the changed order.

For example, when the read management unit 21c2 illustrated in FIG. 5 receives the reading result, the read management unit 21c2 restores the data portion and generates a reading result 223c as illustrated in FIG. 7 to store the reading result 223c into the internal process buffer 223. In this reading result 223c, the order of the logical cluster addresses is changed as compared with the read instruction. In the case of FIG. 7, for example, the cluster of "MBA=0x10, MPA=0x2, MCO=0x154" at the beginning of the read instruction is at the third from the back in the reading result 223c. The cluster of "MBA=0x10, MPA=0x2, MCO=0x15F" which is at the second from the back in the read instruction becomes the beginning in the reading result 223c.

For this reason, as illustrated in FIG. 7, the reading result rearrangement unit 21c3 illustrated in FIG. 5 rearranges the data of the plurality of clusters included in the reading result 223c based on the MCA allocation order 223e1 by referring to the order information 223e. The reading result rearrangement unit 21c3 stores a rearrangement result 223d into the internal process buffer 223. Alternatively, the reading result rearrangement unit 21c3 may directly input the rearrangement result 223d to the MCA allocation unit 21c4.

As illustrated in FIG. 7, the MCA allocation unit 21c4 illustrated in FIG. 5 sequentially allocates new logical cluster addresses to the data of the plurality of clusters by referring to the rearrangement result 223d. In the case of FIG. 7, the logical cluster addresses "MBA=0x11, MPA=0x1, MCO=0x154" to "MBA=0x11, MPA=0x1, MCO=0x15C" are newly allocated to the clusters of the logical cluster addresses "MBA=0x10, MPA=0x2, MCO=0x154" to "MBA=0x10, MPA=0x2, MCO=0x160" of the rearrangement result 223d, respectively.

As illustrated in FIG. 7, the MCA allocation unit 21c4 illustrated in FIG. 5 issues the write instruction regarding the internal process for the logical pages that are process targets in a form sequentially including the logical cluster addresses of the valid clusters to supply the write instruction to the non-volatile memory 7 via the plurality of channels Ch. Accordingly, the non-volatile memory 7 executes the write instruction while using the cache area 32, writes the data of the plurality of clusters into the designated physical position in the storage area 31, and returns the completion notification of the writing to the MCA allocation unit 21c4.

That is, writing the data into the storage area 31 by the internal process is performed on the plurality of sequential physical addresses in the same order as the past sequential write commands. Accordingly, when the sequential read commands are subsequently received from the host, the memory system 1 can read the data according to the sequential read commands via the plurality of channels in order from the plurality of sequential physical addresses in the memory area written in the internal process. For this reason, the cache hit rate during the reading can be improved, and the efficiency of the read process can be improved, so that the command execution time until the execution of the sequential read commands is completed can be shortened.

It is noted that the cache hit rate is a probability that data exists on the cache CM. When the non-volatile memory 7 receives the read command via the channel Ch, the non-volatile memory 7 transmits data from the memory cell array MAR to the cache CM (cache CSH). In a case where the read command is the sequential read command, when the data exists on the cache CM, the process of transmitting the data from the memory cell array MAR to the cache CM can be omitted, so that the efficiency of the read process is improved.

Figure 8:
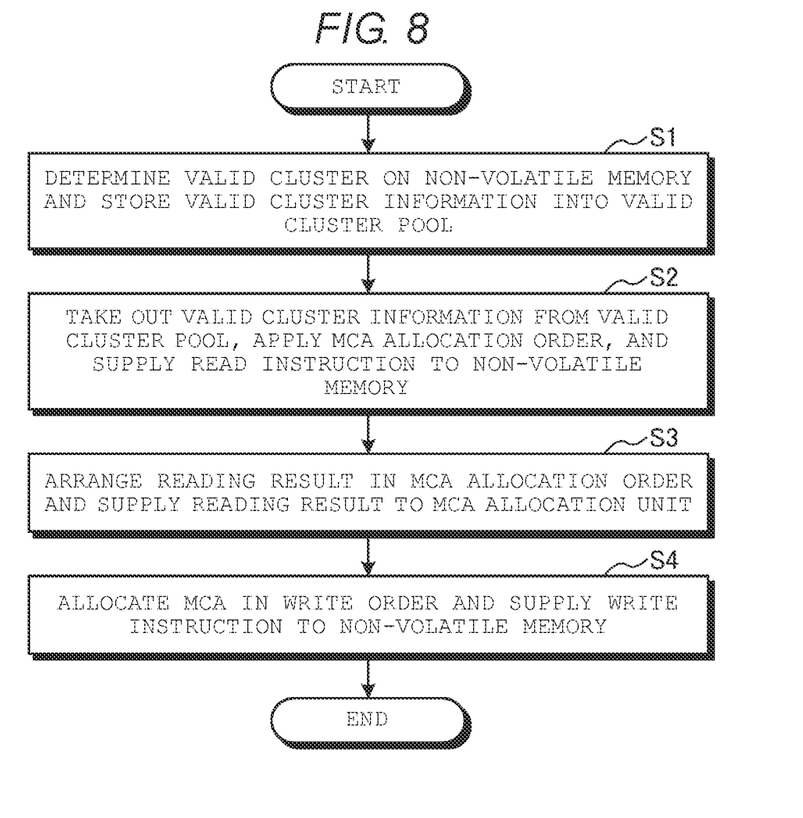
FIG. 8 is a flowchart illustrating an example of operations of the memory system according to at least one embodiment.

Next, operations of the memory system 1 will be described with reference to FIG. 8. FIG. 8 is a flowchart illustrating operations of the memory system 1.

In the controller 5 of the memory system 1, the valid cluster determination unit 21c1 determines the valid cluster on the non-volatile memory 7 and stores the valid cluster information into the valid cluster pool 223b (S1). The read management unit 21c2 takes out the valid cluster information from the valid cluster pool 223b, applies the MCA allocation order 223e1, and generates the order information 223e. In addition, the read management unit 21c2 supplies the read instruction according to the valid cluster information to the non-volatile memory 7 (S2). The reading result rearrangement unit 21c3 arranges the reading results 223e in the order corresponding to the MCA allocation order 223e1 to generate the rearrangement result 223d and supplies the rearrangement result 223d to the MCA allocation unit 21c4 (S3).

Figure 9:
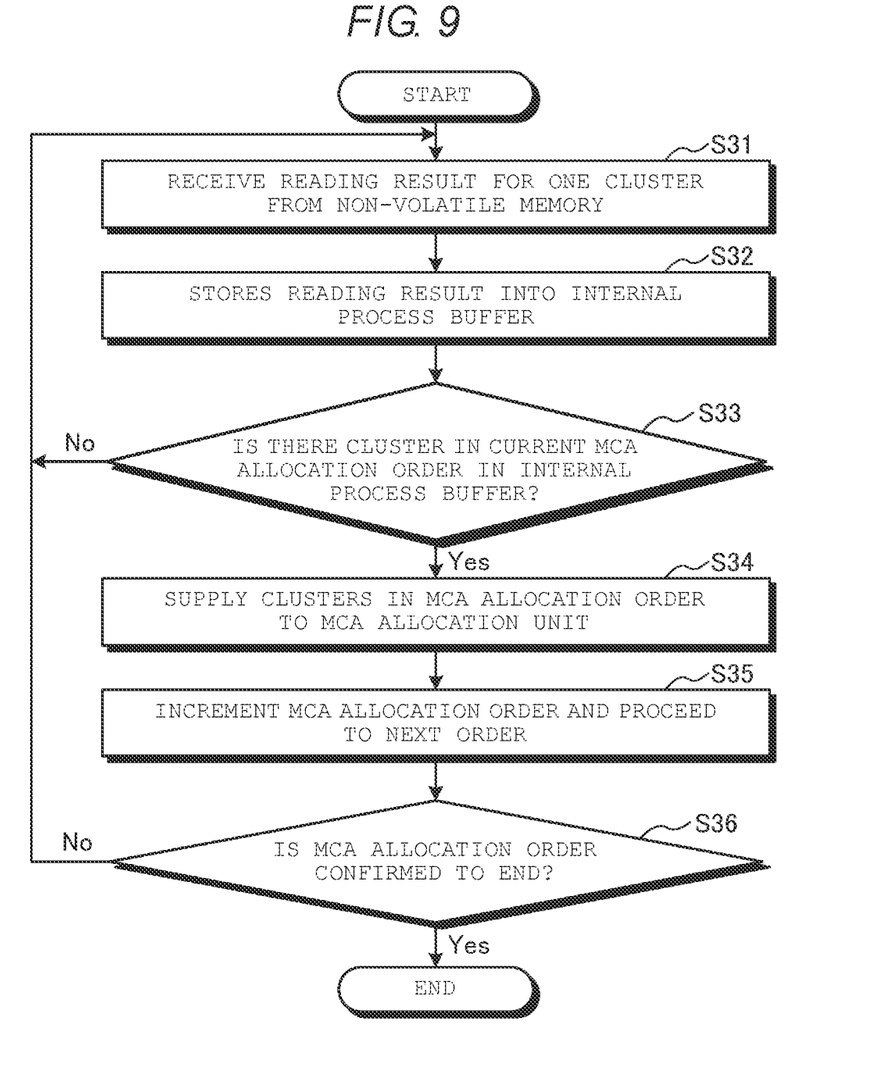
FIG. 9 is a flowchart illustrating the process of rearranging data of the plurality of clusters in at least one embodiment.

For example, in S3, as illustrated in FIG. 9, the following process is performed. FIG. 9 is a flowchart illustrating a process of rearranging a plurality of cluster data. When the reading result rearrangement unit 21c3 receives the reading result for one cluster from the non-volatile memory 7 (S31), the reading result rearrangement unit 21c3 stores the reading result 223c into the internal process buffer 223 (S32). When the cluster in the current MCA allocation order is not in the internal process buffer 223 (No in S33), the reading result rearrangement unit 21c3 returns the process to S31. When the cluster in the current MCA allocation order is in the buffer (Yes in S33), the reading result rearrangement unit 21c3 supplies the cluster in the MCA allocation order to the MCA allocation unit 21c4 (S34). The reading result rearrangement unit 21c3 increments the MCA allocation order and proceeds to the next order (S35). When the reading result rearrangement unit 21c3 does not verify the MCA allocation order to the end with respect to the MCA allocation order 223e1 of the order information 223e (No in S36), the reading result rearrangement unit 21c3 returns the process to S31. When the reading result rearrangement unit 21c3 verifies the MCA allocation order to the end (Yes in S36), the reading result rearrangement unit 21c3 ends the process.

When S3 is completed, the MCA allocation unit 21c4 allocates the logical cluster address (MCA) in the writing order according to the rearrangement result 223d, and supplies the write instruction to the non-volatile memory 7 (S4).

As described above, in at least one embodiment, in the memory system 1, the controller 5 reads the data of the plurality of clusters from the memory area in which the data is written by the sequential write commands in the non-volatile memory 7 by the read instruction regarding the internal process. The controller 5 rearranges the read data of the plurality of clusters in the writing order specified according to the log information. The controller 5 writes back the rearranged data of the plurality of clusters into other memory areas in the non-volatile memory 7 by the write instruction regarding the internal process. Accordingly, writing the data into the non-volatile memory 7 by the internal process can be performed in the same order as the past sequential write commands with respect to the plurality of sequential physical addresses. As a result, after that, when the sequential read commands are received from the host, the memory system 1 can read data according to the sequential read commands in order from the plurality of sequential physical addresses in the memory area written in the internal process via the plurality of channels. Therefore, since the cache hit rate during the reading can be improved and the efficiency of the read process can be improved, the command execution time until the execution of the sequential read commands is completed can be shortened.

It is noted that, in at least one embodiment, a case where the process of rearranging the data of the plurality of clusters is performed in units of one logical page is exemplified, but the process of rearranging the data of the plurality of clusters may be performed in units of the plurality of logical pages. In this case as well, when the write instruction including the plurality of cluster data is sequentially issued after the rearrangement, writing the data into the non-volatile memory 7 by the internal process can be performed in the same order as the past sequential write commands.

In addition, in a case where the plurality of cluster data are returned in an order different from the order instructed by the read instruction as the reading result read from the non-volatile memory 7 by the read instruction regarding the internal process, it is difficult to adopt the method of copying the data of the logical block that is the target of the internal process, as it is. This is because the code rate for missing location and error correction may differ between the logical block of a copy source and the logical block of a copy destination, and it may be difficult to transfer data appropriately.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a controller;
a plurality of channels connected to the controller;
a non-volatile memory including a first memory area and a second memory area, each of the first memory area and the second memory area arranged to be accessed by the controller via the plurality of channels,
wherein the controller is configured to:
write data of a plurality of clusters into the first memory area via the plurality of channels based on a write command regarding sequential data from a host,
specify an order in which the data of the plurality of clusters is written based on log information,
generate order information correlating cluster identification information and writing order information based on the specified order,
read the data of the plurality of clusters from the first memory area based on a read instruction regarding an internal process,
rearrange the read data based on the order information, and
write the rearranged data into the second memory area via the plurality of channels based on a write instruction regarding the internal process.

2. The memory system according to claim 1, wherein the controller is configured to read the data of the plurality of clusters from the second memory area via the plurality of channels based on a read command regarding the sequential data from the host.

3. The memory system according to claim 2, wherein the controller is configured to:
perform writing in parallel into a plurality of areas in the first memory area via the plurality of channels,
perform writing in parallel into a plurality of areas in the second memory area via the plurality of channels, and
perform reading in parallel from the plurality of areas in the second memory area via the plurality of channels.

4. The memory system according to claim 1, wherein the controller is configured to:
allocate a plurality of logical cluster addresses to the plurality of clusters when writing the data of the plurality of clusters into the first memory area,
record the plurality of logical cluster addresses on the log information in an order in which the data is to be written,
specify an order in which the data of the plurality of clusters is written based on the order of the plurality of logical cluster addresses recorded in the log information, and
allocate the plurality of logical cluster addresses to the rearranged data of the plurality of clusters when writing the rearranged data of the plurality of clusters into the second memory area.

5. The memory system according to claim 1, wherein the first memory area includes a plurality of areas allocated to a plurality of logical pages, and
the controller is configured to:
generate the order information for each logical page,
read data for each logical page from the first memory area according to the read instruction, and
rearrange the data for each logical page according to the order information.

6. The memory system according to claim 1, wherein the non-volatile memory includes a NAND memory.

7. The memory system according to claim 1, wherein the controller is configured to perform the rearranging the read data of the plurality of clusters in units of one or more logical pages.

8. The memory system according to claim 2, wherein the controller is configured to:
allocate a plurality of logical cluster addresses to the plurality of clusters when writing the data of the plurality of clusters into the first memory area,
record the plurality of logical cluster addresses on the log information in an order in which the data is to be written,
specify an order in which the data of the plurality of clusters is written based on the order of the plurality of logical cluster addresses recorded in the log information, and
allocate the plurality of logical cluster addresses to the rearranged data of the plurality of clusters when writing the rearranged data of the plurality of clusters into the second memory area.

9. The memory system according to claim 2, wherein the first memory area includes a plurality of areas allocated to a plurality of logical pages, and
the controller is configured to:
generate the order information for each logical page,
read data for each logical page from the first memory area according to the read instruction, and
rearrange the data for each logical page according to the order information.

10. A control method in a memory system, wherein the memory system includes a non-volatile memory including a first memory area and a second memory area, each of the first memory area and the second memory area can be accessed via a plurality of channels, the control method comprising:
writing data of a plurality of clusters into the first memory area via the plurality of channels based on a write command regarding sequential data from a host;
specifying an order in which the data of the plurality of clusters is written based on log information;
generating order information correlating cluster identification information and writing order information based on the specified order;
reading the data of the plurality of clusters from the first memory area based on a read instruction regarding an internal process;
rearranging the read data of the plurality of clusters based on the order information; and
writing the rearranged data into the second memory area via the plurality of channels based on a write instruction regarding the internal process.

11. The method according to claim 10, wherein the data of the plurality of clusters is read from the second memory area via the plurality of channels based on a read command regarding the sequential data from the host.

12. The method according to claim 11, further comprising:
performing writing in parallel into a plurality of areas in the first memory area via the plurality of channels,
performing writing in parallel into a plurality of areas in the second memory area via the plurality of channels, and
performing reading in parallel from the plurality of areas in the second memory area via the plurality of channels.

13. The method according to claim 10, further comprising:
allocating a plurality of logical cluster addresses to the plurality of clusters when writing the data of the plurality of clusters into the first memory area,
recording the plurality of logical cluster addresses on the log information in an order in which the data is to be written,
specifying an order in which the data of the plurality of clusters is written based on the order of the plurality of logical cluster addresses recorded in the log information, and
allocating the plurality of logical cluster addresses to the rearranged data of the plurality of clusters when writing the rearranged data of the plurality of clusters into the second memory area.

14. The method according to claim 10, wherein the first memory area includes a plurality of areas allocated to a plurality of logical pages, and
the method further comprises:
generating the order information for each logical page,
reading data for each logical page from the first memory area based on the read instruction, and
rearranging the data for each logical page based on the order information.

15. The method according to claim 10, wherein the non-volatile memory includes a NAND memory.

16. The method according to claim 10, further comprising:
performing the rearranging the read data of the plurality of clusters in units of one or more logical pages.

17. The method according to claim 11, further comprising:
- allocating a plurality of logical cluster addresses to the plurality of clusters when writing the data of the plurality of clusters into the first memory area,
- recording the plurality of logical cluster addresses on the log information in an order in which the data is to be written,
- specifying an order in which the data of the plurality of clusters is written based on the order of the plurality of logical cluster addresses recorded in the log information, and
- allocating the plurality of logical cluster addresses to the rearranged data of the plurality of clusters when writing the rearranged data of the plurality of clusters into the second memory area.

18. The method according to claim 11, wherein
the first memory area includes a plurality of areas allocated to a plurality of logical pages, and
the method further comprises:
generating the order information for each logical page,
reading data for each logical page from the first memory area based on the read instruction, and
rearranging the data for each logical page based on the order information.

\* \* \* \* \*